July 28, 1970     K. E. MORAN     3,521,877

APPARATUS FOR MAKING COMPOSITE FILAMENTARY STRUCTURES

Filed July 18, 1968     3 Sheets-Sheet 1

KEVIN E. MORAN
INVENTOR.

ATTORNEY

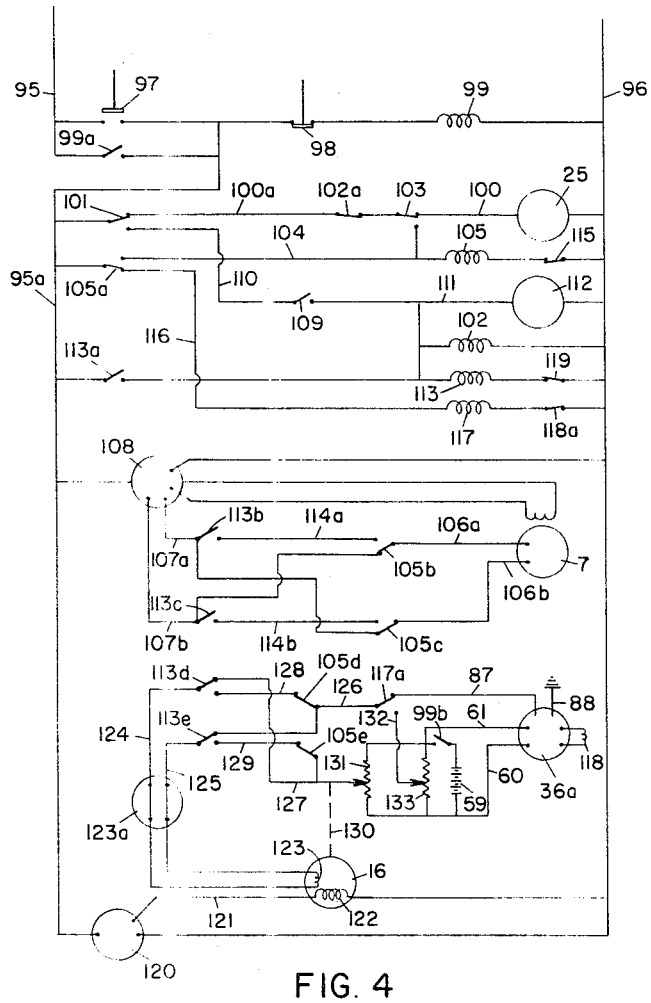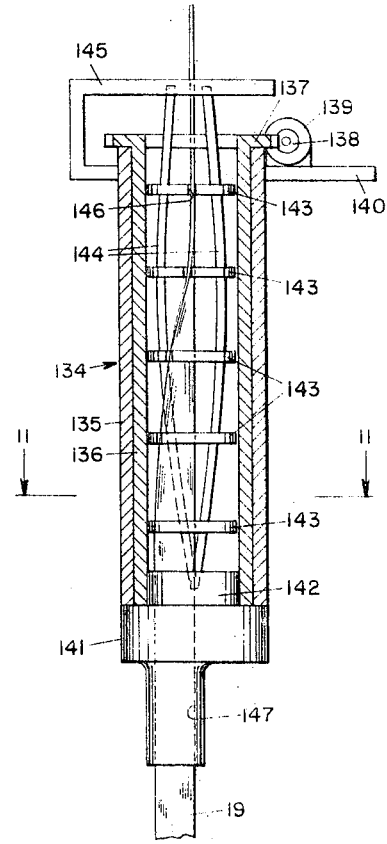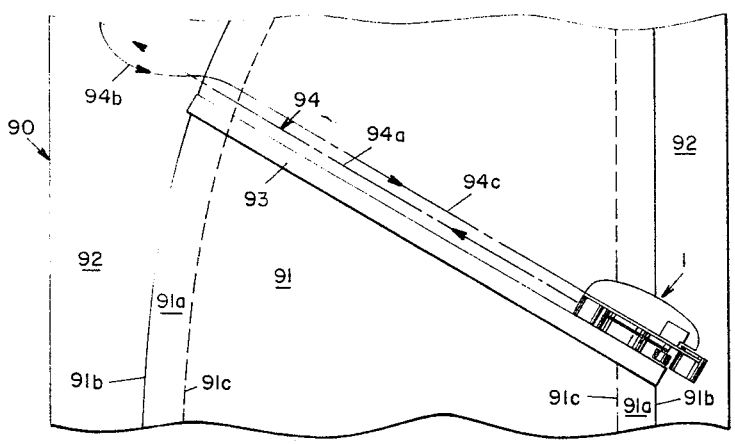

July 28, 1970  K. E. MORAN  3,521,877

APPARATUS FOR MAKING COMPOSITE FILAMENTARY STRUCTURES

Filed July 18, 1968  3 Sheets-Sheet 3

KEVIN E. MORAN
INVENTOR.

BY *Edward S. Bell*

ATTORNEY 3,521,877
**APPARATUS FOR MAKING COMPOSITE
FILAMENTARY STRUCTURES**
Kevin E. Moran, Cumberland, Md., assignor to Hercules
Incorporated, Wilmington, Del., a corporation of Delaware
Filed July 18, 1968, Ser. No. 745,854
Int. Cl. B65h 29/46; G01p 15/04
U.S. Cl. 270—31                                                9 Claims

ABSTRACT OF THE DISCLOSURE

This invention relates to an apparatus for making composite structures by laying pre-impregnated filamentary tapes in a side-by-side relation on a pattern surface, the apparatus comprising a mobile unit adapted to traverse the pattern area while being steered by a control device that senses the edge of the previously laid tape to steer the unit along a path following the edge of that tape and including a tape-laying advance stroke and an idle reverse stroke. The apparatus includes a compensator for adjusting for the difference in the length of the path followed by the opposite edges of the tape as it is laid onto a contoured surface. The edge sensing device is adapted to float on an air bearing over the pattern surface so that it will not contact the tape, and senses the edge through variations in the pressure in a conduit for supplying a stream of fluid impinging upon the surface at the edge so that the volume of fluid and thus the pressure in the conduit varies with the position of the device laterally of the edge.

---

The present invention relates to an apparatus for making composite structures from pre-impregnated filamentary tapes, and more particularly to an apparatus for making composite filamentary structures that are sheet-like in configuration, that is, surfaces that are generally planar or only gently contoured.

In certain structures such as aircraft wings, weight as well as strength and stiffness are of such importance that the structure can advantageously be made of relatively expensive materials such as boron filaments. In a typical structure, the filaments are arranged in a side-by-side relation in layers with the filament axis in any one layer being angled relative to the filament axis in each of the adjacent layers and with the structure bonded into a coherent mass by a binding material such as an epoxy resin.

Because of the extremely long winding time that would be involved in producing a large scale structure such as an aircraft wing from filaments that are individually laid in an oriented manner, it has heretofore been customary to preform the filaments into tapes that may for example be three inches wide and consist of a single layer of oriented filaments, that is, filaments in parallel side-by-side relation, extending lengthwise of the tape. The filaments are impregnated with the binding material which may be partially cured so that the tape is coherent and somewhat tacky. The tape is wound into rolls with a separator, which may be a ribbon of non-sticking material such as a coated paper tape, between the adjacent turns of the filamentary tape to keep the successive turns from coming into contact with each other and sticking. When the filaments are provided in this manner, the width of the filamentary material deposited on the surface in a single pass over the pattern surface will be the width of the tape, which, with a tape that is three inches wide and is formed of filaments having a diameter of four thousandths of an inch, would include seven hundred and fifty filaments. At the same time, being tacky, the tape is adhesively held in the desired position on the pattern area on which it is laid while the subsequent layers are being laid and while the binding material is being finally cured to produce the finished structure.

The apparatus heretofore employed for laying the pre-impregnated tapes has consisted of X-Y plotting machines which, in order to make large scale structures, were very large and were necessarily very expensive. These machines also had the disadvantage that they operated mechanically and laid each length of tape along a path that was displaced from the previous length of tape by an amount that was calibrated to be equal to the width of the tape. Since the tape width varied, these machines tended to leave gaps between or to overlap the edges of the adjacent tapes, both of which conditions materially decreased the performance characteristics of the structure. Another disadvantage of these machines is their relative inability to follow contours that may be normally encountered in wing surfaces, and to lay tape smoothly in side-by-side abutting relation on such surfaces as the varying contours distorts the tape path from a straight line.

The objects of this invention are to provide an apparatus for laying pre-impregnated filamentary tapes onto a surface in a side-by-side abutting relation, which apparatus will lay adjacent tapes accurately with a minimum of overlaying or gapping at the edges of adjacent tapes. It is also an object of this invention to provide such an apparatus that is relatively inexpensive and which will produce large scale and contoured surfaces in an efficient manner.

Another object of this invention is to provide an edge sensing device which is capable of detecting an edge that may be very shallow and of generating a control signal in response to the position of the device laterally relative to the edge, which device is simple, inexpensive and easy to operate but which is also efficient and accurate. It is also an object of this invention to provide such a device which will sense an edge without engaging the edge or physically tracking the surface adjacent to the edge.

Further objects of this invention are to provide means for compensating for the differences in the length of the paths followed by the different filaments across the width of a filamentary tape when the tape is laid on a contoured surface, which means is relatively inexpensive and trouble-free in operation.

Briefly, the above objects have been achieved by a self-propelled apparatus adapted to traverse the tape-receiving or pattern surface and having a steerable wheel and a sensing device that responds to an edge such as the edge of a previously laid tape for controlling the steerable wheel and thus the direction of travel of the apparatus. The apparatus carries a supply of the tape, which may be in the form of a roll from which the tape is drawn as the apparatus moves through its tape-laying advance stroke, and which is fed under the driving wheel onto the pattern surface. Through the normal tackiness of the tape and the pressure due to the weight of the apparatus, the tape is thus adhesively secured in place on the pattern surface. Controls are also provided to stop the apparatus at the end of a tape-laying stroke, sever the tape, reverse the direction of motion of the apparatus and index it into a new tape-laying path immediately adjacent the path just completed, operate it through an idle return stroke, and again reverse the same to operate through another tape-laying advance stroke. Because the apparatus travels freely over the pattern surface guided only by the edge of the previously laid tape, it is free to follow that edge even though, after several tapes have been laid, the edge may become wavy or curved because of the contour of the surface.

The sensing device that is used to control the steerable wheel comprises a foot having a bore for directing fluid onto the surface at the edge. The fluid pressure in the conduit for supplying fluid to the bore varies with the volume of fluid escaping at the exit of the bore and this in turn varies with the back pressure caused by positioning more or less of the exit in opposed relation relative to the surface adjacent to the edge to be sensed.

The compensating means comprises a device for imparting a programmed twist to the tape about one edge whereby that edge merely turns about its longitudinal axis but the opposite edge is thrown spirally about the same whereby the length of the path traversed by a filament at the opposite edge is increased and there is thus a take-up function performed thereon. The device comprises a series of discs having a diameter that is substantially twice the width of the tape and radial slots substantially equal to the width of the tape. The tape is threaded through the slots and the discs are turned differentially to effect a spiral arrangement of them.

With the above and other objects in view, the present invention is hereinafter described with reference to the drawings, in which:

FIG. 4 is a circuit diagram illustrating the electrical connection of the machine of FIG. 1.

FIG. 5 is a schematic view illustrating in plan the operation of the machine of FIG. 1.

FIG. 6 is a sectional view longitudinally of the compensating device of FIG. 1.

FIG. 11 is a sectional view taken substantially on the line 11—11 of FIG. 6.

Figure 1:
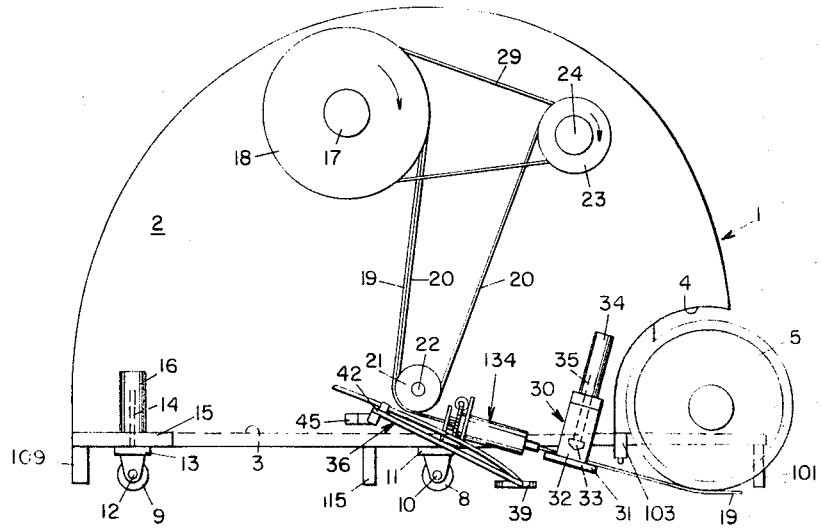
FIG. 1 is a side elevational view of a machine embodying the present invention.

With reference to the drawings, the present invention is illustrated as embodied in a machine 1 that comprises a frame or body member consising essentially of a vertical plate 2 and a horizontal plate 3 that extends laterally in one direction from the bottom edge of the plate 2. At its leading edge, the vertical plate 2 has a cut-out 4 for accommodating the drive wheel 5 which is mounted upon the output shaft of a speed reducing unit 6 fixed to the horizontal plate 3 and having its input shaft connected to a reversible electric motor 7 that is also mounted upon the horizontal plate 3. Thus, upon operation of the motor 7, the drive wheel 5 is rotated in either the forward or reverse direction, as determined by the direction of rotation of the motor 7, and thus imparts translation to the machine 1 in either the forward or reverse direction.

In addition to the drive wheel 5, the machine 1 is supported by a fixed wheel 8 and a steerable wheel 9. The wheel 8 is journaled for rotation upon an axle 10 that is secured by a bracket 11 to the underside of the horizontal plate 3 at its outer edge and substantially at the mid-point lengthwise thereof. The steerable wheel 9 is journaled for rotation on an axle 12 carried by a bracket 13 having a shaft 14 extending upwardly through a horizontal platform 15 that is secured to the vertical plate 2 at the bottom edge thereof and on the side opposite from the horizontal plate 3. The wheel 9 is disposed substantially in alignment with the drive wheel 5, that is, it is centered relative to a vertical plane normal to and substantially at the mid-point of the axis of the wheel 5. The shaft 14 defines the steering axis of the wheel 9 and is mounted for rotation relative to the platform 15. To impart steering movements to the shaft 14, it is formed as the shaft of a steering motor 16, which may be a conventional servo-motor, whereby electrical signals to the motor 16 will effect a calibrated turn of the shaft 14 and thus of the wheel 9.

The vertical plate 2 is provided with a supporting stud 17 that is adapted to receive a tape roll 18 on which is wound a tape 19. For purposes of illustration, the tape 19 may be pre-impregnated tape of boron filaments arranged in a single layer in a side-by-side relation whereby the individual filaments are all oriented in the direction longitudinally of the tape, and are held in this relationship by a pre-impregnated and partially cured binding material. As noted above, such a tape may be for example about three inches wide and consist of some seven hundred and fifty individual boron filaments each of which may be about four thousandths of an inch in diameter. Because of the partially cured binding material, the tape 19 is tacky. To prevent the successive turns of the tape on the roll 18 from sticking, which would require a greater effort to unwind the tape from the roll as well as create the possibility of splitting the tape as it is unwound, a separator strip 20 is wound with the tape 19 on the roll 18 and is thereby interposed between each turn of the tape 19 on the roll. The separator strip 20 is made of a material that will not adhere to the tacky surface of the tape 19, such as a plastic coated paper. At the same time, the surface of the drive wheel 5 is preferably coated or made of a suitable material so that it will not stick to the tape.

The tape 19 and separator strip 20 are unwound together from the roll 18 and pass to an idler wheel 21 journaled for rotation on a shaft 22 fixed to the vertical plate 2 at the bottom thereof. At the idler wheel 21, the separator strip 20 is stripped from the tape 19 with the tape 19 passing under the drive wheel 5 while the separator strip 20 passes to take-up drum 23 mounted upon and keyed to a shaft 24 for unitary rotation. The shaft 24 is carried and driven by a tape feed motor 25 mounted on the vertical plate 2 on the opposite side from the drum 23, the shaft 24 being connected by means of a one-way clutch 27 to the output shaft 26 of a gear reduction unit 28 which is mounted on the motor 25. Alternatively, the shaft 24 is driven from the tape roll 18 by a belt 29 which has a slip engagement with the shaft 24 whereby the drum, when driven by the belt 29, will maintain a predetermined tension on the separator strip 20.

The stud 17, idler wheel 21 and take-up shaft 24 are each mounted with the axis thereof parallel to the axis of the drive wheel 5 whereby the tape 19 has a straight run from the roll 18, under the idler wheel 21, to the drive wheel 5. The idler wheel 21 may also be provided with flanges (not shown) for guiding the tape and thereby preventing lateral wandering of the tape as it is fed longitudinally.

Between the idler wheel 21 and the drive wheel 5, the tape 19 passes through a cutter 30 which comprises an anvil plate 31 carried by a bracket 32 secured to the vertical plate 2 of the body member 1. A cutter 33 is mounted in the bracket 32 and is adapted to cooperate with the anvil plate 31 to sever the tape. The cutter 33 is actuated by means of a solenoid-controlled air-actuated cylinder 34 with the rod 35 on which the cutter 33 is mounted constituting the piston rod of the cylinder.

For acutating the steerable wheel 9, there is provided a control device 36 that is designed to sense a stepped edge, which may be the edge of a previously laid tape 19 or, on the initial pass of the machine at the beginning of a tape-laying operation, a template of comparable thickness. The thickness of the tape may be in the order of four thousandths of an inch, and the control device 36 must be sensitive enough to respond to that thickness and, because the tape 19 is tacky, preferably without physically tracking the edge of the tape. As illustrated in FIGS. 6–9, the edge-sensing or control device 36 comprises a foot 37 that is gimbal-mounted for universal movement by means of a pair of aligned pivot screws 38 in a ring 39 that is in turn mounted on a pair of aligned pivot screws 40 in the times at the forked end 41 of a support arm 42. At its other end, thearm 42 is connected by a pivot pin 43 to an ear 44 of a bracket 45 secured to the vertical plate 2. The pivot pin 43 is on an axis normal to the plate 2 so the forked end 41 of the arm 42 is movable toward and away from the pattern surface with the axis of the pivot screws 40 parallel to the surface.

The foot 37 is provided centrally thereof with a cavity 46 (FIG. 9) that is closed for example by a cover 47 and has a series of holes 48 in the bottom wall 49. Air under pressure is introduced into the cavity 46 by a tube 50 connected to a fitting 51 in the cover 47, which air escapes through the holes 48 to create an air bearing for floating the foot 37 relative to the surface over which it is positioned. The foot 37 also has a pair of relatively small holes 52 and 53 therethrough in the area outwardly of the cavity 46, the holes 52 and 53 being disposed diametrically of the foot 37 on opposite sides of the cavity 46 on a line transversely of the foot 37 through the axes of the pivot screws 40. The holes 52 and 53 are connected individually to a source of air under pressure by separate conduits 54 and fittings 55.

Figure 9:
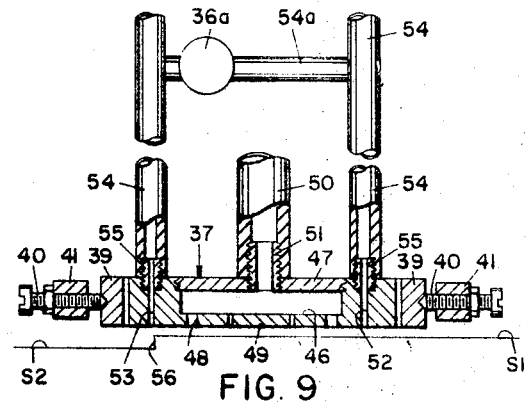
FIG. 9 is a sectional view substantially on the line 9—9 of FIG. 7.

As illustrated in FIG. 9, the foot 37 is designed to sense an edge 56 of a surface S1 which, as illustrated, may be the edge between the surface S1 and another surface S2 that is substantially planar and parallel to the surface S1 but slightly displaced below it. In a tape-laying operation, the surface S2 is the original level of the pattern surface on which the composite filamentary structure is to be formed or the top surface of a previously laid layer of filamentary tapes, while the surface S1 is the top surface of the layer of tapes presently being laid.

In operation, the foot 37 floats over the surface S1 on a cushion of air supplied through the holes 48. The hole 52 is positioned over the surface S1 while the hole 53 is positioned over the surface S2 or preferably substantially over the edge 56. The air bearing supports the foot 37 off the surface S1 a distance that is sufficiently small so that the impingement of the stream of fluid from the holes 52 and 53 onto the surface S1 creates a back pressure which reduces the volume of fluid exhausting from the hole over the volume which would otherwise be exhausted. Because of the difference in the heighth of the surfaces S1 and S2, there is a difference in the back pressure and thus in the volume of fluid exhausted from a hole such as the hole 53 when it is positioned over the surface S1 or the surface S2 and there is a progressive increase or decrease in the volume of fluid exhausted as the hole 53 moves across the edge 56 and thus progressively reduces or increases the back pressure. In other words, when the hole 53 is supplied with fluid from a substantially constant pressure source, the volume of fluid exhausted varies progressively from a maximum when the exit of the hole 53 is over the surface S1 and a minimum when it is over the surface S2. The fluid pressure within the conduit 54 that is connected to the hole 53 varies with the volume of the fluid exhausted, that is, when the volume increases as the exit of the hole 53 moves from opposed relation with the surface S1 across the edge 56 and onto the surface S2, the fluid pressure in the conduit undergoes a corresponding decrease. On the other hand, the hole 52 remains over the surface S1 and therefore has a relatively static condition which produces a substantially constant fluid pressure in the conduit 54 to the hole 52, which pressure is substantially equal to the minimum pressure in the conduit 54 for the hole 53. Thus, the pressure in the conduit 54 for the hole 52 becomes a reference pressure against which the fluctuating pressure in the conduit 54 for the hole 53 is compared in order to generate the control signal that energizes the motor 16 and thus steers the wheel 9.

Figure 10:
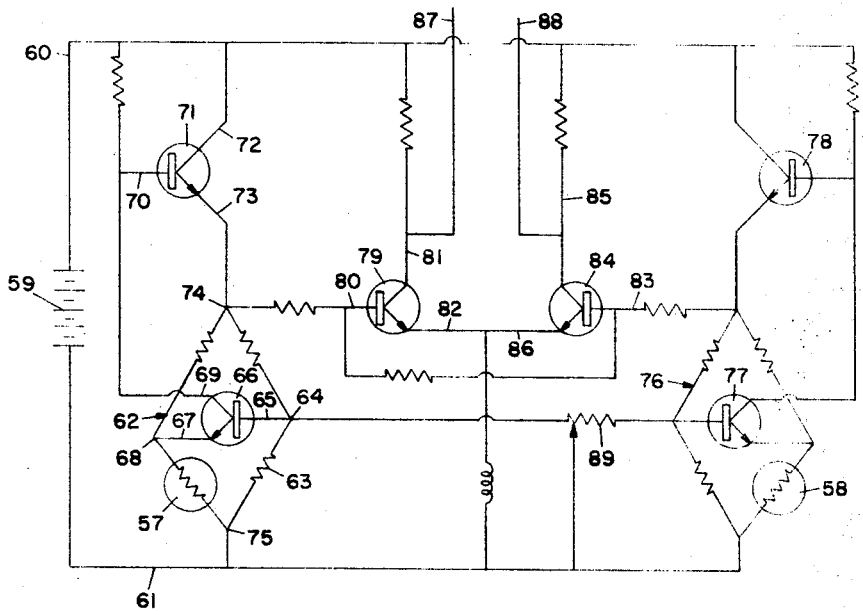
FIG. 10 is a circuit diagram for the sensing device of FIG. 7.

The means for comparing the pressure drop in the conduits 54 is similar to the sensing unit disclosed in pending U.S. patent application Ser. No. 632,239. Briefly, this sensing unit, which is illustrated as the unit 36a in FIG. 9 and the circuit diagram of which is illustrated in FIG. 10, comprises a pair of thermistors 57 and 58 that are mounted in longitudinally spaced relation in a conduit 54a that interconnects the two conduits 54 so that the flow of air in the interconnecting conduit because of the differential pressure drop in the conduits 54 has a cooling effect upon them. The amount and the direction of the flow, which is a function of the relative pressure drop in the conduits 54, is indicated by the relative cooling of the two thermistors, that is, the direction of flow is indicated by the fact that the thermistor that is upstream relative to the direction of flow is cooled more than the downstream thermistor because of the pre-heating of the air by the upstream thermistor, and the rate of flow is indicated by the increased cooling rate.

The circuit diagram of the sensing unit is illustrated in FIG. 10, in which the battery 59 represents a source of electrical power that is connected to a power lead 60 and a ground lead 61. The thermistor 57 is connected in one leg of a bridge 62 opposite from a resistor 63. The bridge terminal 64 at the resistor 63 is connected to the base lead 65 of a control transistor 66 while the emitter lead 67 thereof is connected to the bridge terminal 68 at the thermistor 57 and the collector lead 69 is connected to the base lead 70 of a power transistor 71 and to the power lead 60. The collector lead 72 of the transistor 71 is connected to the power lead 60 and the emitter lead 73 thereof is connected to the input terminal 74 of the bridge. The output terminal 75 of the bridge is connected to the ground lead 61. The second thermistor, that is, the thermistor 58, is connected in the same manner as the thermistor 57 in a circuit including a bridge 76, a control transistor 77 and a power transistor 78.

In operation, electrical power is supplied to the base lead 70 of the power transistor 71, which then begins to conduct so that a voltage is applied at the input terminal 74 of the bridge 62. At this time, the voltage on the base lead 65 of the control transistor 66 is less than the voltage at the emitter lead 67 and bridge terminal 68 so the transistor 66 is not conducting. With power in the bridge 62, the thermistor 57 begins to heat and its resistance begins to fall. As the current in the thermistor leg of the bridge 62 thus increases, the voltage at the bridge terminal 68 drops until it becomes equal to the voltage at the bridge terminal 64 less the voltage drop across the transistor 66. The control transistor 66 then begins to conduct and lowers the voltage on the base 70 of the power transistor 71. The power supply by the transisor 71 to the input terminal 74 of the bridge is thus lowered until an equilibrium is established, that is, until the current in the thermistor leg of the bridge 62 is adequate to generate heat in the thermistor 57 at a rate matching the rate at which it is dissipated from the thermistor.

When the rate at which heat is dissipated from the thermistor increases, as by an increased flow of air over the same, the thermistor tends to cool and thus increase in resistance. The current in the thermistor leg of the bridge 62 is thus reduced and there is a corresponding increase in the voltage at the bridge terminal 68. As the emitter voltage at the control transistor 66 is thus increased, the control current is reduced and the voltage at the base 70 of the power transistor 71 is increased, whereby the voltage is raised at the input terminal 74 of the bridge 62 and there is a corresponding increase in the voltage at the bridge terminals 64 and 68 and of the current flow in the bridge. The power supplied to the thermistor and the resulting heat are thus increased to restore the thermistor to its equilibrium temperature at the new and increased heat dissipation rate. When the rate at which heat is dissipated from the thermistor decreases, the circuit reacts oppositely to re-establish equilibrium.

The output of the device, which is the control signal used to actuate the steering motor 16, is taken across the input terminal 74 of the bridge 62 and the corresponding terminal of the bridge 76. As illustrated, there is provided an output transistor 79 having a base lead 80 connected to the input terminal 74 of the bridge 62. The collector lead 81 of the transistor 79 is connected to the power lead 60 while the emitter lead 82 is connected to the ground lead 61. The input terminal of the bridge 76 is also connected to the base lead 83 of a comparable output transistor 84 having its collector lead 85 connected to the power lead 60 and having its emitter lead 86 connected to the ground lead 61. The output leads 87 and 88 are connected to the collector leads 81 and 85 of the transistors 79 and 84.

Adjustment of the output to produce a zero output at a pre-determined variation in the flow through the holes 52 and 53 is provided by an adjustable resistor 89 that adjusts the voltage at the bridge terminals at the base of each of the control transistors 66 and 77. The device is normally adjusted to produce a zero control signal when the hole 53 is centered exactly over the edge 56 so that, if there is relative movement laterally between the hole 53 and the edge 56 so that the hole 53 becomes more or less opened and there is an increase or decrease in the rate of flow of air from the same and a corresponding drop in the pressure in the conduit 54, an appropriate positive or negative control signal is generated to adjust the steering motor 16 and thus re-establish the centered relation.

The operation of the present device is illustrated briefly in FIG. 5. As shown, there is provided a generally planar surface 90 having a pattern area 91 over which the tape 19 is laid and border areas 92 around the pattern area. For the initial pass of the machine 1 in each tape layer, a template 93 is used to guide the machine, the template being for example a strip of metal having a thickness comparable to the thickness of the tape 19 and being laid across the pattern area 91 along the desired axis of orientation of the tape 19. The machine 1 is initially placed in its starting position as shown and operation thereof is started. The machine progresses along the path 94 which defines one cycle of the machine and includes an advance stroke 94a during which a tape is laid, an indexing motion 94b at the end of the advance stroke during which the machine steps along the pattern area a distance sufficient to align the machine with the free edge of the tape 19 that was just laid, and a return stroke 94c during which the machine returns to a new starting position. During the advance stroke of the next cycle, which begins automatically, the machine retraces the return stroke of the previous cycle.

In order to provide a detectable edge between the pattern area 91 and the border areas 92, the supporting structure of the pattern area, which may also be the support upon which the filamentary structure is finally cured, is preferably formed of a magnetic material such as steel while the border area 92 is formed of a non-magnetic material such as aluminum.

The operation of the present apparatus may be more fully described with reference to the circuit diagram of FIG. 4. The machine is connected to the source of electrical power through a power lead 95 and a ground lead 96. A normally open push-button type start switch 97 is connected at one side to the power lead 95 and at the other side to a power lead 95a which is in turn connected to the ground lead 96 through a normally closed stop switch 98 and a relay coil 99. When energized, the relay coil 99 closes a holding switch 99a that is connected in parallel with the start switch 97 across the power leads 95 and 95a. Thus, when the start switch 97 is momentarily closed, the coil 99 is energized and closes the switch 99a so that the power lead 95 is connected to the power lead 95a through the holding switch 99a and will remain so connected until the stop switch 98 is opened.

The tape feed motor 25 is connected at one side to the ground lead 96 and is connected at its other side to a lead 100 which is connected to the power lead 95a by a limit switch 101, a lead 100a which includes a normally-closed steering by-pass switch 102a, and a normally-closed tape-actuated switch 103. The limit switch 101 is magnetically actuated so that the lead 100 is connected to the power lead 95a whenever the switch 101 is over the non-magnetic border area 92, but not when it is over the magnetic pattern area 91.

With the machine 1 in its cycle-starting position wherein the switch 101 is over the non-magnetic border area 92, the lead 100a is connected to the power lead 95a so that when the start switch 97 is closed, the tape feed motor 25 is energized to wind the separator strip 20 on the drum 23. As the strip 20 is thus wound, the tape 19 is also pulled from the roll 18 and the leading edge thereof is advanced from the anvil plate 31 under the drive wheel 5. As soon as the leading end of the tape 19 is wedged under the drive wheel 5, its advance is stopped and further feeeding of the tape causes the same to buckle. The tape-actuated switch 103 is mounted on the plate 2 immediately adjacent to the path of the tape 19 so that when the tape buckles, it throws the switch 103 to break the connection to the lead 100 and thus stop the tape feed motor 25.

When the switch 103 is thrown to break the connection to the tap feed motor 25, it connects the lead 100a to a parallel lead 104 which supplies power to the coil 105 of a relay that operates the machine 1 in the forward direction. Upon energization of the coil 105 of this forward relay, the holding switch 105a is thrown to connect the lead 104 directly to the power lead 95a. Thus, when the switch 103 is released as the bulge in the tape 19 is pulled out as the machine advances and the lead 104 is thus disconnected from the lead 100a, the relay coil 105 remains energized.

The coil 105 also throws reversing switches 105b and 105c in the armature circuit of the main drive motor 7 into the forward driving position, that is, the position as illustrated in FIG. 4 in which the armature leads 106a and 106b of the motor 7 are connected by the leads 107a and 107b to an SCR power supply unit 108. Connected in this manner, the motor 7 is energized to drive the machine 1 in its tape-laying forward or advance stroke 94a.

As the machine advances, the edge sensing device 36 generates a control signal that, through the motor 16 steers the wheel 9, thus directing the machine along the edge of the template 93, or upon successive passes, the edge of the previously laid tape. The tape in all cases passes under the drive wheel 5 and is thus pressed onto the pattern surface 91 so that it will be adhesively secured thereto. As the machine advances, the tape is pulled from the roll 18 which, as it turns, acts through the belt 29 to drive the take-up drum 23 for the separator strip 20. When driven by the belt 29, the drum 23 is overdriven relative to the clutch 27 and thus runs freely. The drive ratio of the belt 29 is such as to drive the drum 23 sufficiently fast at all times to take up the separator strip 20 at a rate greater than the rate at which it is released by the roll 18, which of course requires that the belt 29 slip relative to the drum 23.

Mounted on the leading edge of the horizontal plate 3 adjacent to the steerable wheel 9 is a magnetically actuated switch 109 that, like the switch 101, is adapted to be actuated upon being moved from over the magnetic pattern area 91 to the non-magnetic border area 92. The switch 109 is normally open when it is over the magnetic pattern area 91 and is closed upon movement onto the non-magnetic border area 92.

The switch 109 is connected at one side by a lead 110 to one pole of the switch 101, and particularly to that pole which is normally closed when the switch 101 is over the magnetic pattern area 91. The lead 110 is thus connected to the power lead 95a during the advance stroke of the machine. At its other sides the switch 109 is connected to a lead 111 that is connected to the solenoid 112 of the cutter 30, to the coil 102 of the steering bypass relay, and a coil 113 of a reversing relay. Energization of the solenoid 112 actuates the cutter 30 to sever the tape 19. When the coil 102 is energized, it opens the switch 102a in the lead 100a, thereby preventing energization of the tape-feed motor 25 before the beginning of the next advance stroke.

The coil 113 closes a holding switch 113a which connects the lead 111 to the power lead 95a independently of the switch 101, and throws switches 113b and 113c in the circuit of the main drive motor 7 thereby connecting the leads 107a and 107b to a pair of power-reversing leads 114a and 114b respectively. The leads 114a and 114b are connected at their ends opposite from the switches 113b and 113c to one set of poles of the switches 105b and 105c, but, inasmuch as these poles are disconnected at the time, the motor 7 is not immediately reversed but rather, continues in forward drive The circuit is, however, now set up for reversal when the switches 105b and 105c are thrown.

Figure 2:
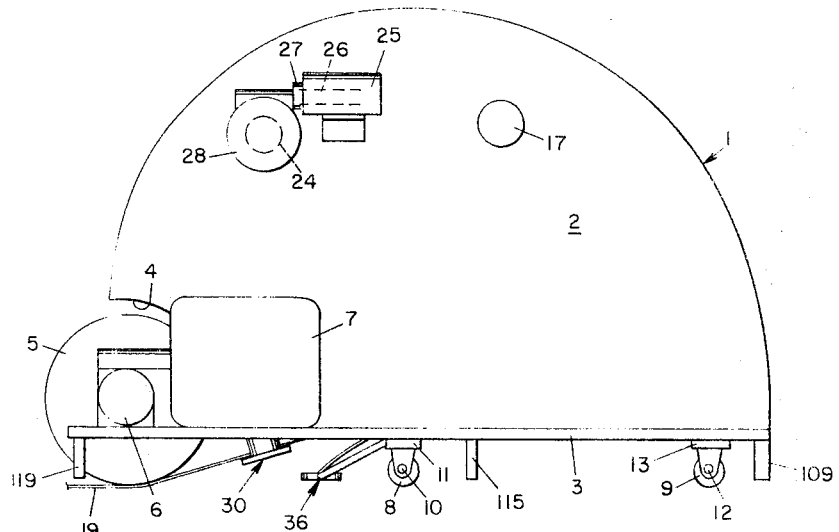
FIG. 2 is an elevational view of the machine of FIG. 1 from the opposite side.
Figure 3:
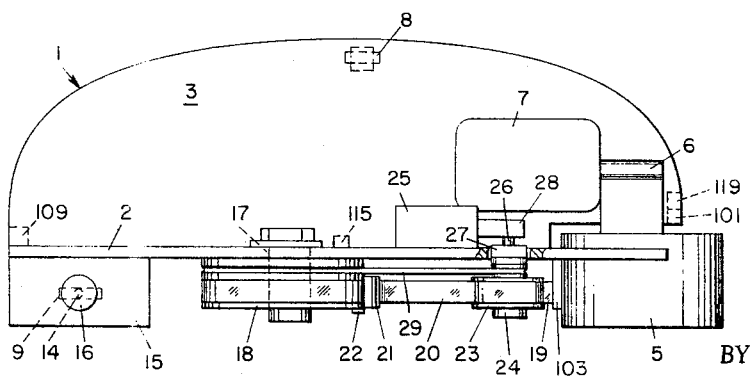
FIG. 3 is a plan view of the machine of FIG. 1.
Figure 7:
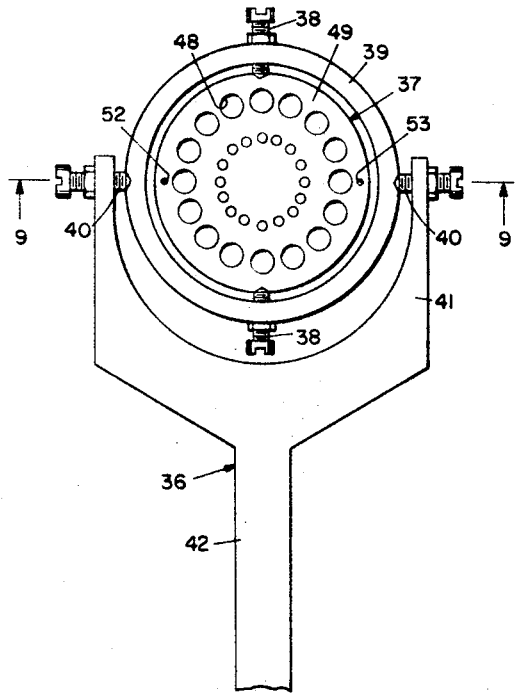
FIG. 7 is a fragmentary plan view illustrating the sensing device of the machine of FIG. 1.
Figure 8:
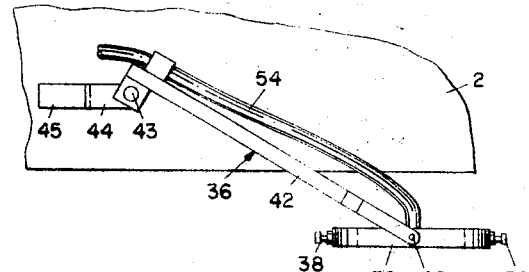
FIG. 8 is a fragmentary side elevation view of the machine of FIG. 1 showing the mounting of the sensing device of FIG. 7.

The machine continues forward until the coil 105 is de-energized, which is provided by a switch 115 that, like the switches 101 and 109, is magnetically actuated and is thus thrown when it moves from the magnetic pattern area 91 onto the non-magnetic border area 92. The switch 115 is located so that it will be thrown as soon as the end of the tape 19 that remains on the anvil plate 31 after the cutter 30 has been actuated, is run-out under the drive wheel 5. With reference to FIGS. 1–3, it will be seen that switch 115 is disposed substantially at the mid-point lengthwise of the horizontal plate 3. While the specific locations of the switches such as the switches 10, 109 and 115 may be varied, the mechanics of the system are such that they can be conveniently accommodated as shown by providing a magnetic border area 91a that magnetically is in effect a continuation of the pattern area 91. The areas 91a lie between the edges 91b of the pattern area 91 and the lines 91c, illustrated in dotted lines in FIG. 5, that is spaced a pre-determined distance inwardly of the lines 91b, sufficient to accommodate the mechanics of the system. In operation, the tape 19 is laid only on the pattern area inside the lines 91c.

When the switch 115 is actuated at the end of the advance stroke of the machine, the coil 105 is de-energized, thus, throwing the switch 105a from connection with the lead 104 to connection with a lead 116 that is in turn connected to a coil 117. When the coil 117 is energized by connection of the lead 116 to the power lead 95a through the switch 105a, it throws a switch 117a in the circuit of the steering motor 16, as is more fully explained hereinafter, whereby the machine is steered through the indexing motion 94b. The machine continues through the programmed indexing turn until the sensing device 36 senses the edge of the tape 19 that was just laid and begins to generate a control signal, at which time a switch 118a is opened to de-energize the coil 117, the switch 118a being normally closed but held open as noted below whenever the sensing device 36 is producing a control signal.

Upon de-energization of the coil 105, the switches 105b and 105c in the circuit of the main drive motor are thrown to reverse the connection and thereby reverse the direction in which the machine is driven. The machine is thus driven in reverse through the indexing motion 94b and the return stroke 94c.

At the end of the return stroke, the coil 113 is de-energized by opening a switch 119 that, like the switches 101, 109 and 115, is magnetically-actuated. The switch 119 is normally closed when it is traversing the magnetic pattern area 91 and opens when it passes over the non-magnetic border area 92. Physically, the switch 119 is so located that it opens when the main drive wheel 5 is in the desired position for beginning the next tape-laying advance stroke. The position of the switch 119 on the machine 1 can be modified by pre-determining the width of the magnetic border areas 91a, and conveniently, can be located immediately adjacent to the switch 101.

When the coil 113 is de-energized, the switches 113b and 113c open to disconnect the reversing leads 114a and 114b from the power leads 107a and 107b. At this time, the switches 105b and 105c connect the armature leads 106a and 106b to the reversing leads 114a and 114b so the main drive motor is thus de-energized and the machine is stopped. Simultaneously, the holding switch 113a is opened to disconnect the lead 111 from the power lead 95a, thereby de-energizing the solenoid 112 of the cutter 30 and the coil 102 of the switch 102a in the line 100a. At this time, the tape-actuated switch 103 is closed and the switch 101, which was actuated simultaneously with the switch 119, is in the position to connect the line 100a to the power lead 95a so that when the switch 102a is thus closed, the tape feed motor 25 is energized to begin a new cycle. Automatic re-cycling of the machine thus continues until the stop switch 98 is opened.

The power supply for the steering motor 16 comprises a servo amplifier 120 that is connected at its opposite sides to the power lead 95a and the ground lead 96, and is connected by a lead 121 to the field windings 122 of the motor 16. The control windings 123 of the motor 16 are connected through a suitable amplifier 123a by leads 124 and 125 to the bases of the switches 113d and 113e which are operated simultaneously with the switches 113b and 113c by the coil 113. The switches 113d and 113e function to reverse the steering action which is necessary because the steering wheel 9 leads the drive wheel 5 during the advance stroke and trails the same during the return stroke, that is, during the advance stroke a clockwise turn of the steering wheel 9 effects a right hand turn of the machine but during the return stroke, a counter-clockwise turn of the steering wheel is required to effect a right hand turn of the machine. The leads 124 and 125 are connected to the control signal leads 126 and 127 either directly through one pair of poles of the switches 113d and 113e or in a reversed manner through the other pair of poles of the switches 113d and 113e, a pair of reversing leads 128 and 129, and switches 105d and 105e. More particularly, during the advance stroke of the machine 1, the coil 113 is de-energized and the coil 105 is energized so that the switches 113d and 113e are connected directly to the control signal leads 126 and 127 and the switches 105d and 105e are open, and, during the reverse stroke, the switches are reversed so that the switches 113d and 113e are connected to the reversing leads 128 and 129 which are in turn connected to the steering signal leads 126 and 127 by the switches 105d and 105e.

In the circuit of the edge-sensing device, the power supply from the battery 59 is controlled by a switch 99b operated by the coil 99 so that, so long as the coil 99 is energized, the battery circuit is connected. The output lead 87 of the control device 36 is connected and disconnected relative to the control signal lead 126 by a switch 117a actuated by the coil 117, that is, when the coil 117 is de-energized, the switch 117a connects the leads 87 and 126 and disconnects them when energized. When the leads 87 and 126 are connected, the control windings 123 are energized and the motor 16 turns until, through the feed back connection 130, the adjustable resistor 131 is adjusted to balance the circuit. When the switch 117a is thrown to disconnect the lead 87 from the control signal lead 126, and to connect it to the output lead 132 of an adjustable resistor 133 which imposes a predetermined bias voltage on lead 126 and thereby imparts a predetermined turn to the motor 16, that is, the turn through the indexing motion 94b.

With reference to FIG. 6, there is illustrated a modification of the invention comprising a compensator 134 for accommodating the differences in the lengths of the paths followed by the different filaments across the width of the tape as the tape is laid onto a contoured surface. Without compensating for the differences, the tape cannot be laid smoothly onto the pattern surface because the length of tape that is laid is determined by the longest path so there is excess or surplus length in the filaments at the shorter paths and this excess must bulge or fold as the tape is pressed onto the pattern surface.

The compensator 134 comprises a tubular housing 135 secured to the vertical plate 2 and having a torque tube 136 mounted therein for rotation relative thereto. At its upper end, the tube 136 has a worm wheel 137 that meshes with a worm 138 on the shaft of a servo motor 139 carried by a bracket 140 secured to the housing 135 whereby rotation is imparted to the tube 136 upon energization of the motor 139. At its lower end, the tube 136 carries a mouthpiece 141 having a reduced diameter mounting portion 142 that extends into the end of the tube 136 and is secured therein for rotation with the tube 136. A plurality of discs 143 are rotatably mounted in spaced relation along the tube 136, the discs being mounted on a pair of torsion bars 144 that are fixed at the one end thereof to the rotatable mouthpiece 141 and at the other end to a stationary arm 145 on the bracket 140. Thus, when the mouthpiece 141 is turned by rotation of the tube 136, the torsion bars 144 impart a corresponding turn to each of the individual discs 143 with the magnitude of the turn decreasing from a maximum at the disc 143 that is nearest to the mouthpiece to a minimum at the disc 143 that is nearest to the stationary end of the torsion bars 144.

The radius of the discs 143 is substantially the same as the width of the tape 19 that is designed to be fed through the compensating device 134, that is, with a tape that is three inches wide, the discs 143 are generally six inches in diameter. Each of the discs 143 has a radial slot 146 that extends inwardly from the periphery of the disc to the center thereof. The discs 143 are arranged on the torsion bars 144 with the slots 146 in alignment endwise of the tube 136. The mouthpiece 141 is also provided with a guide channel 147 endwise thereof that is aligned at its input end with the slots 146 in the discs.

In operation, the tape 19 is threaded through the slots 146 of the discs 143 and through the channel 147 of the mouthpiece. As the machine 1 operates through its advance stroke, the tape 19 moves endwise through the compensator 134. The motor 139 is operated to impart a predetermined turn to the tube 136 over the length of the advance stroke and thus a corresponding twist to the discs 143 that reduces in magnitude progressively from the mouthpiece 141 toward the bracket 140. The filaments at the one edge of the tape that is at the center of the discs 143 are merely twisted about their axis. The filaments at the outer edge of the tape however are displaced spirally and the path thereof through the compensator is thus increased in length. As the machine advances, the compensator 134 takes up and stores progressively varying lengths of the filaments across the width of the tape, which is possible because the resin with which the tape is pre-impregnated is only partially cured so that adjacent filaments can be displaced endwise. At the completion of the advance stroke, the compensator is reversed to release the stored excess which may then be severed as waste by the cutter 30 or may be laid on the pattern area with the tape 19 either at the end of the advance stroke or the beginning of the next advance stroke.

What I claim and desire to protect by Letters Patent is:

1. Apparatus for laying filamentary tapes in side-by-side relation on a tape-receiving pattern surface, comprising a body member,
means for supporting said body member for movement over the pattern surface including a drive wheel and a steerable wheel movable about a steering axis normal to the pattern surface,
main drive means for imparting rotation to said drive wheel and thereby driving said body member to traverse the pattern surface,
steering means for moving the steerable wheel about the steering axis and thereby directing the movement of the body member as it traverses the pattern surface,
tape feeding means on said body member for feeding the tape under the driving wheel as said body member traverses the pattern surface, and
edge-sensing means acting in spaced relation to and responding to an edge of a previously laid tape or the like for controlling the steering means and thereby steering the body member along a path substantially parallel to said edge as it traverses the pattern surface.

2. Apparatus in accordance with claim 1 having control means for operating the same through a tape-laying advance stroke and a return stroke, and means for severing the tape at the end of the advance stroke.

3. Apparatus in accordance with claim 2 in which said tape feeding means comprises a tape feed motor adapted to advance the leading end of the tape beneath said drive wheel and said control means includes means for operating said tape feed motor while said main drive means is inoperative and for initiating operation of said main drive means through an advance stroke when the leading end of the tape is lodged under the drive wheel.

4. Apparatus in accordance with claim 3 in which said tape feed motor is stopped upon initiation of the advance stroke of the main drive means and the tape is fed during the advance stroke by being pulled under the drive wheel.

5. Apparatus in accordance with claim 4 in which there is provided a winding means for taking up a separator strip coextensive with the tape, said tape feed motor being connected for driving the winding means to advance the tape by advancing the separator strip, and drive means for actuating the winding means after the tape feed motor is stopped and while tape is fed during the advance stroke.

6. Apparatus in accordance with claim 2 in which said control means includes means for steering the apparatus at the end of the advance stroke through an indexing motion in which said edge-sensing means is moved into cooperation with the free edge of the tape that was laid during the advance stroke whereby it will track that edge during the return stroke and will re-trace the same during the next advance stroke.

7. Apparatus in accordance with claim 1 having means for compensating for differences in the lengths of the paths of different filaments across the width of the tape as the apparatus traverses contoured surfaces.

8. Apparatus in accordance with claim 7 in which said compensating means comprises a plurality of discs, each having a radial slot through which the tape is threaded, means for supporting said discs in axially aligned and spaced relation with the slots in the discs aligned, means for imparting angular movement to said discs to displace said slots spirally.

9. Apparatus in accordance with claim 8 in which said means for imparting angular movement to said discs comprises torsion means anchored at one end and having drive means at the other end for imparting torsional stress thereto, said torsion means being operatively associated with each of said discs for imparting angular displacement thereto.

References Cited

UNITED STATES PATENTS 3,400,927  9/1968  Martin et al. _____ 270—31

LAWRENCE CHARLES, Primary Examiner

U.S. Cl. X.R.

73—516